Jan. 19, 1943.  J. H. SEBALD ET AL  2,308,719
FEED WATER HEATER
Filed Aug. 31, 1940  5 Sheets-Sheet 2

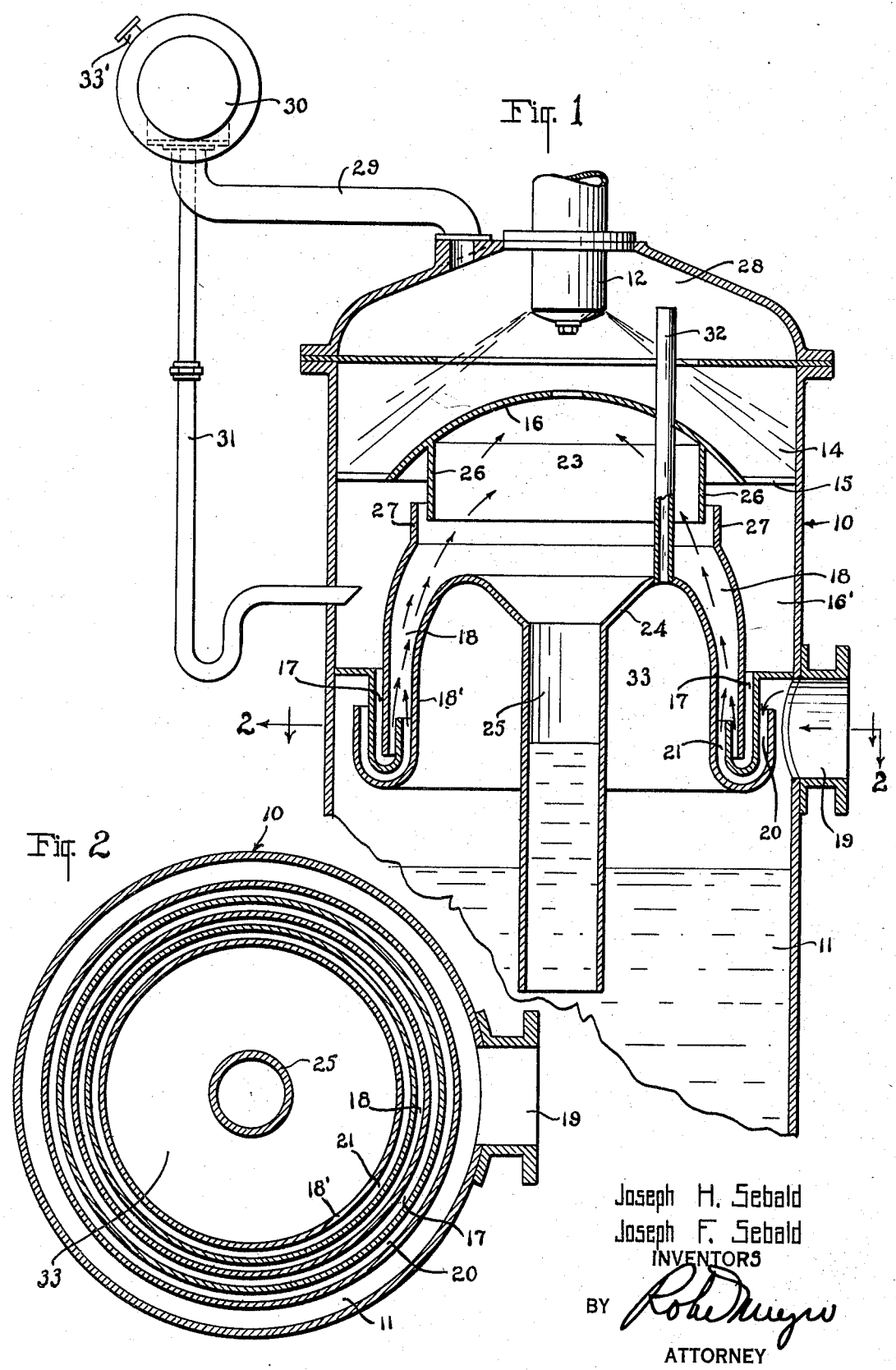

Joseph H. Sebald
Joseph F. Sebald
INVENTORS

BY
ATTORNEY

Jan. 19, 1943.   J. H. SEBALD ET AL   2,308,719
FEED WATER HEATER
Filed Aug. 31, 1940   5 Sheets-Sheet 3

Joseph H. Sebald
Joseph F. Sebald
INVENTORS

BY
ATTORNEY

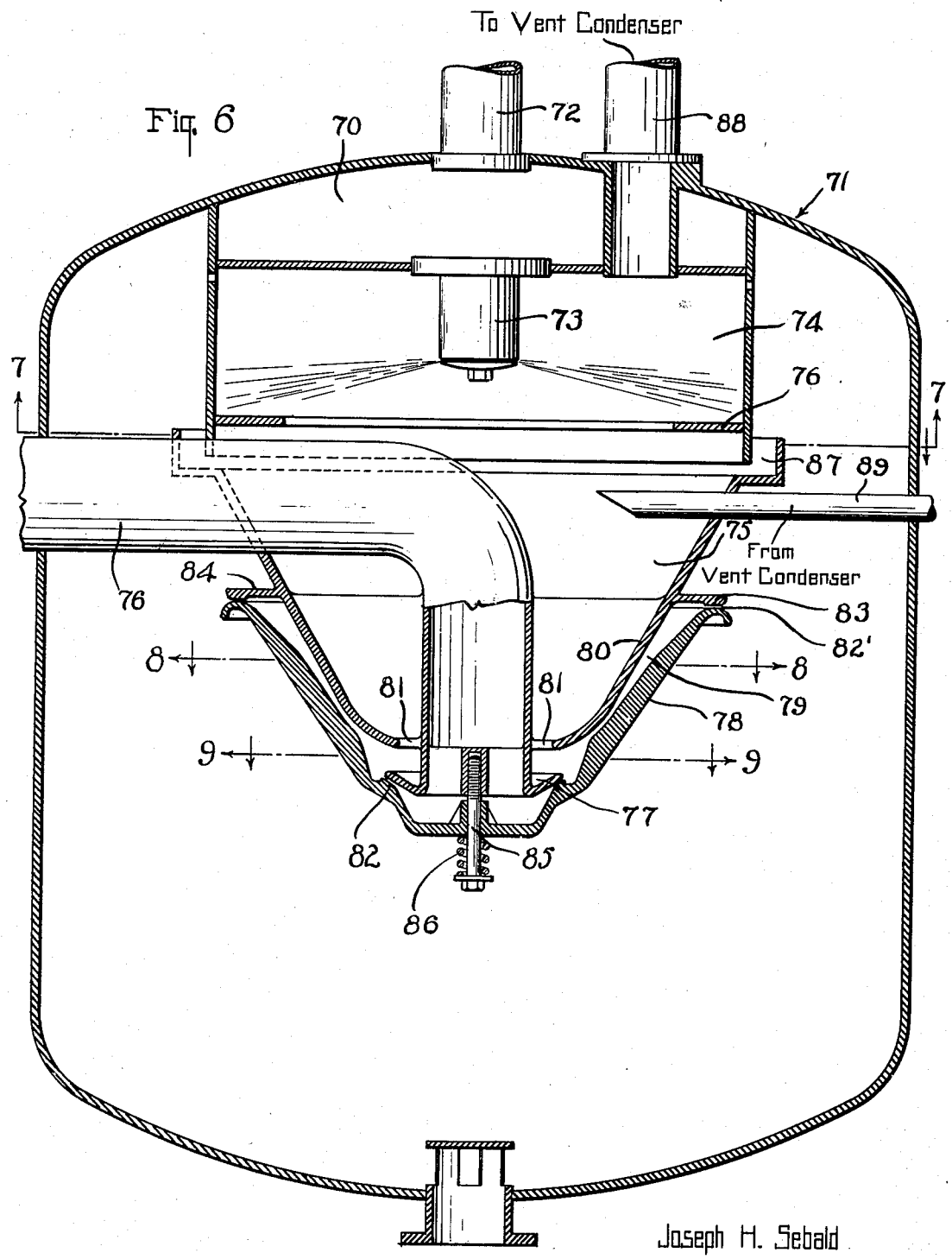

Jan. 19, 1943.　　J. H. SEBALD ET AL　　2,308,719
FEED WATER HEATER
Filed Aug. 31, 1940　　5 Sheets-Sheet 5
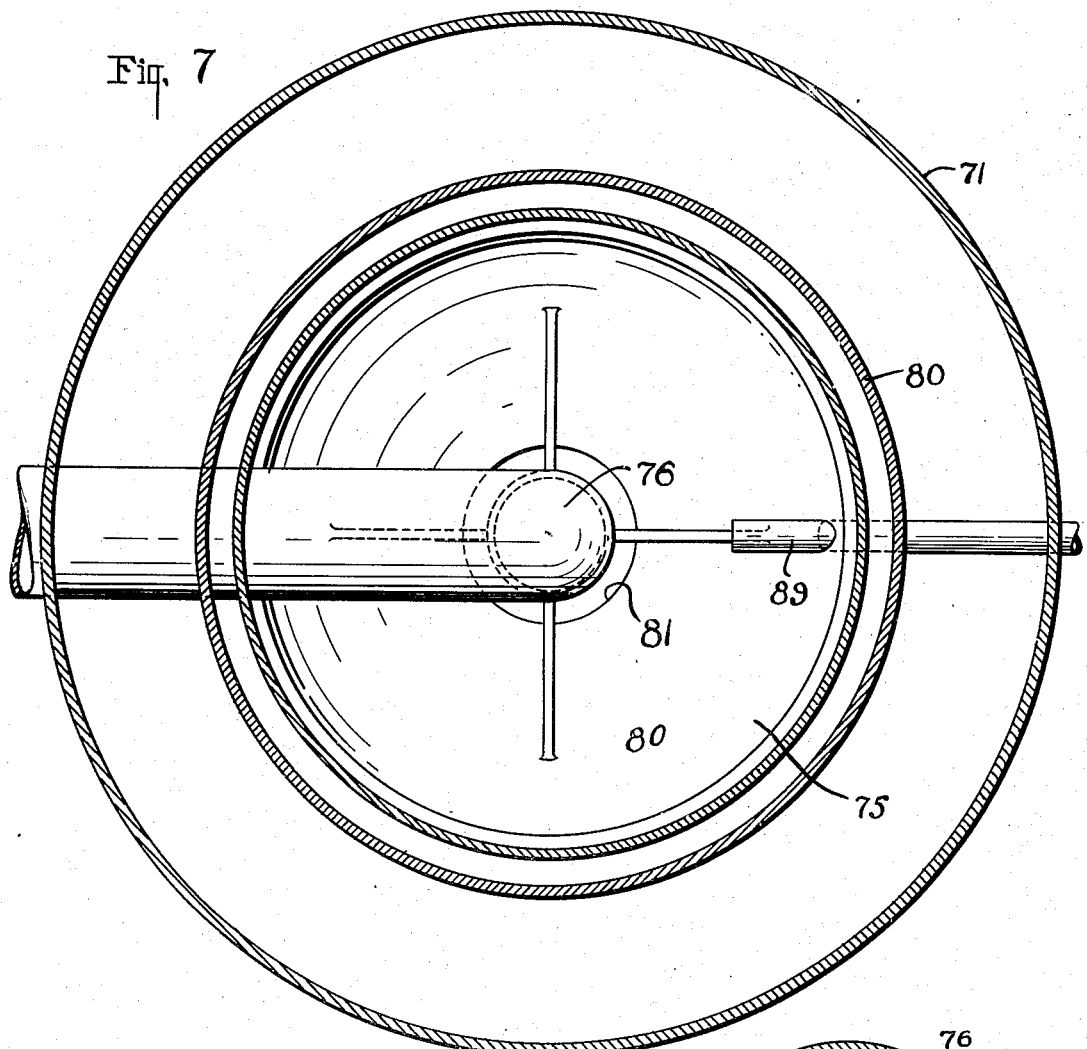
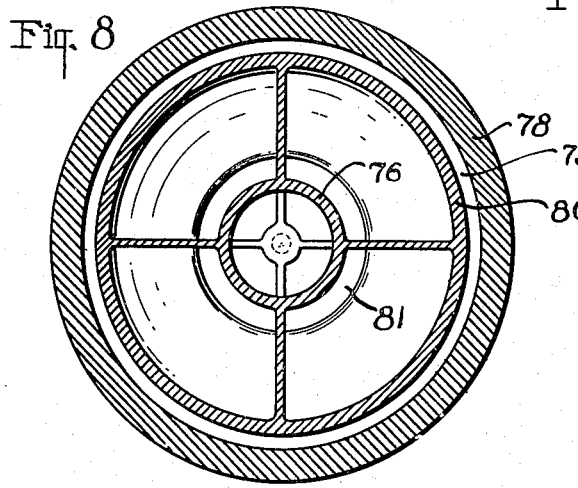
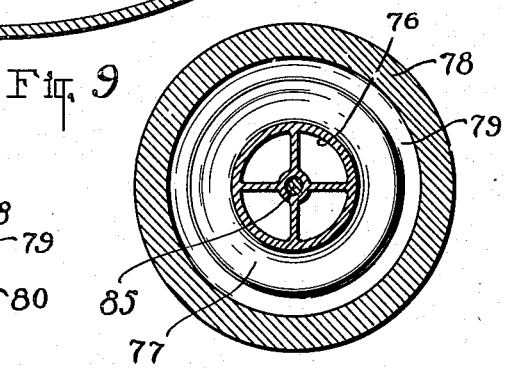
Joseph H. Sebald
Joseph F. Sebald
INVENTORS
BY *[signature]*
ATTORNEY Patented Jan. 19, 1943

2,308,719

UNITED STATES PATENT OFFICE 2,308,719

FEED WATER HEATER

Joseph H. Sebald and Joseph F. Sebald, Arlington, N. J., assignors to Worthington Pump and Machinery Corporation, Harrison, N. J., a corporation of Delaware Application August 31, 1940, Serial No. 354,974

14 Claims. (Cl. 261—115)

This invention relates to improvements in methods of and apparatus for heating and degasifying liquids, and more particularly to an improved method and apparatus for heating and deaerating water for boiler feed service and other services or purposes requiring practically oxygen-free water.

In water heating and deaerating apparatus heretofore in use two general types of deaerating heaters have been universally employed, namely those known in the art as the "tray type" and those known as the "atomizing type." Both of these types are practically equally efficient in deaerating or degasifying water, and have provided "zero oxygen" tests, as indicated by the so-called "Winkler test." However, scientific advances in apparatus and systems for conducting tests of the oxygen content of water have shown that the "Winkler test" is not accurate to a fine degree, the results of such tests depending upon water temperature and other conditions, and water tested by the "Winkler test" and showing "zero oxygen" in fact contained in some instances as much as .03 cc. of oxygen per liter of water.

With the advance in steam power plant design and efficiency and in scientific testing equipment, there has arisen a demand or requirement for further reductions in the oxygen content of boiler feed water, and also for a reduction in weight and size of the deaerating feed water heating apparatus, particularly in the marine field.

While a high degree of deaeration may be obtained with the "tray type" heating and deaerating apparatus, such apparatus has the disadvantage that as its efficiency in deaerating or degasifying a given quantity of water increases, so also does its size, weight and cost of manufacture increase. Also, under some conditions where there is calcium and magnesium salts present in the water being treated, such heaters are subject to impairment of their efficiency through scale formation on the tray banks.

It has been found that while heaters of the so-called atomizing type will provide a high degree of degasifying of the water, and that heaters of this type, for handling a given quantity of water, are much lighter, smaller and less expensive than heaters of the tray type capable of handling a like quantity of water with a comparable degree of degasification, they leave much to be desired in the actual removal of oxygen from the heated feed water.

Heaters of the atomizing type embody, as the first stage of heating and deaeration of the feed water, an ordinary jet type of water heater in which the water is heated by being sprayed into a steam-filled chamber. The heated and partially deaerated water is then drawn into intimate contact with the steam, while the latter is at a velocity sufficiently high to atomize the preheated and partially deaerated water brought into contact therewith. Thus the water is brought to its final temperature and degree of deaeration during which action it is sprayed into the water storage portion of the heater shell. There is no appreciable reduction of pressure, and only instantaneous contact of the steam and water in the final atomizing stage of such heaters.

The primary object of the present invention is the provision of an improved method of and apparatus for heating and degasifying liquids which will provide a maximum heating and deaeration of the water, characterized by the fact that the partially heated and partially deaerated water is brought into intimate contact with the steam and maintained in such contact for a relatively long period of time, as compared with the interval of contact of steam and water in atomizing type heaters. During such period of intimate contact, in the present invention, the steam and water are thoroughly mixed and passed through a space in the form of a passage of gradually increasing cross-sectional area from its entrance end to its exit end, thereby providing a gradual lowering or reduction of pressure. Finally the thoroughly mixed steam and water is projected or sprayed into an area of lower pressure, where reboiling or flashing of the water takes place, resulting in degasification of the water to a degree approaching actual "zero oxygen" content or a degasified condition, tested by modern and efficient testing apparatus, of approximately .002 cc. of oxygen per liter of water, and under some conditions, even lower.

A further object of the present invention is the provision of an improved method of and apparatus for providing the high degree of heating and degasification above specified, wherein the apparatus employed, while giving a high degree of heating and degasification, will compare favorably with heaters of the atomizing type, of comparable capacity, as to size, weight and cost of manufacture.

With these and other objects in view, as may appear from the accompanying specification, the invention consists of various features of construction and combination of parts, which will be first described in connection with the accompanying drawings, showing a feed water heater of the preferred form embodying the invention, and the features forming the invention will be specifically pointed out in the claims.

In the drawings:

Figure 1 is a fragmentary vertical section through an apparatus for heating and degasifying liquids, constructed in accordance with the present invention.

Figure 2 is a horizontal section taken on the line 2—2 of Fig. 1.

Figure 6 is a vertical section through still another modified form of the water heating and degasifying apparatus.

Figure 7 is a cross-section on the line 7—7 of Figure 6.

Figure 8 is a cross-section on the line 8—8 of Figure 6.

Figure 9 is a horizontal cross-section on the line 9—9 of Fig. 6.

Figure 3:
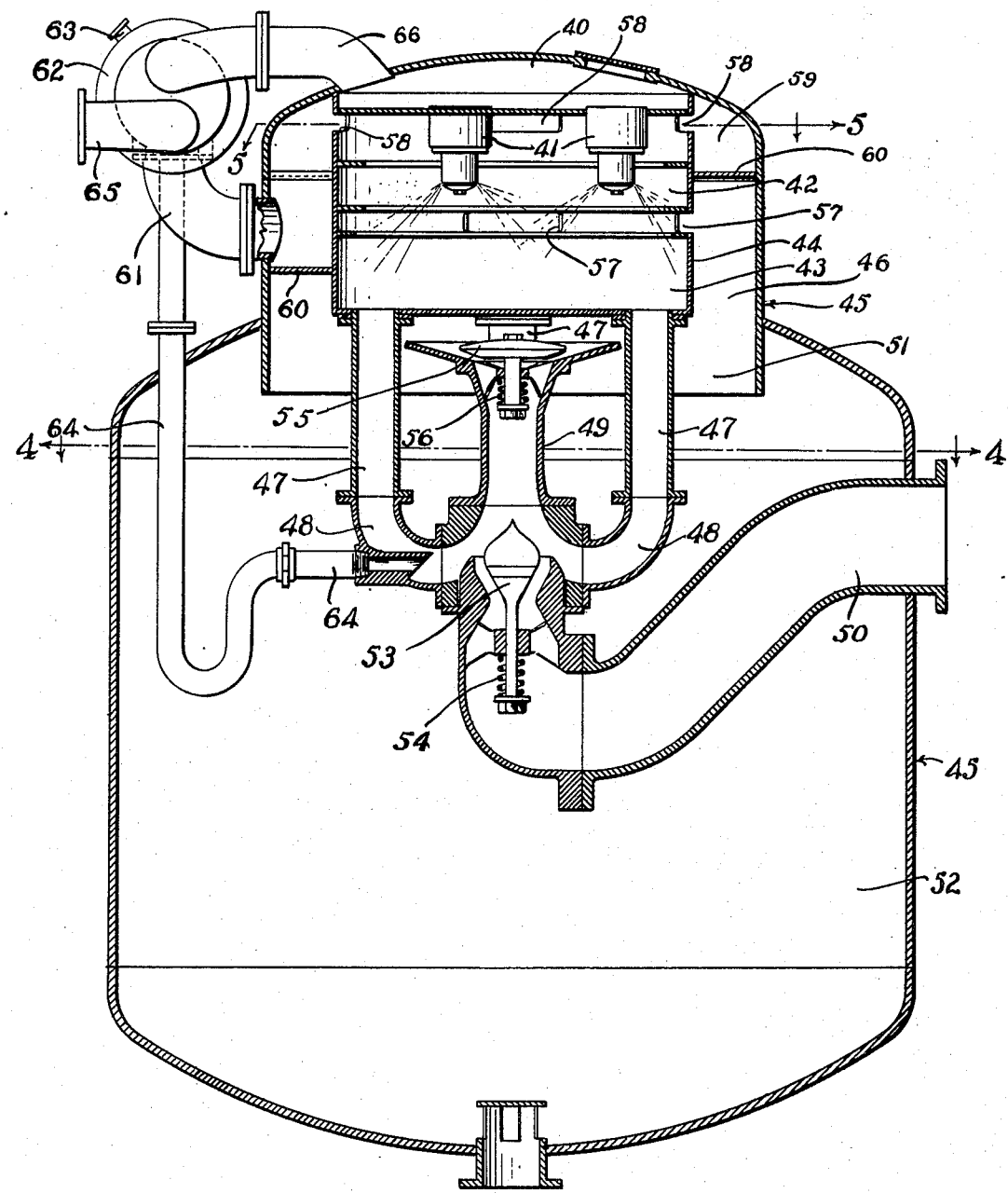
Figure 3 is a vertical section through a modified form of the water heating and degasifying apparatus.

In the form of the invention illustrated in Figures 1 and 2 of the drawings the feed water heater and deaerator comprises a shell 10, the lower portion of which provides a storage space, as shown at 11, for storing the heated and deaerated water until it is removed for use.

The water to be treated is sprayed by a spray valve 12, of any approved type, into the initial heating and deaerating chamber 14, where it contacts the steam entering the initial heating and deaerating space or compartment 14 through the annular space 15 formed about the separating baffle 16. In the space or chamber 14 the water will be heated to substantially the temperature corresponding to the steam pressure in this space or compartment and will be partially deaerated or degasified.

From the chamber or compartment 14 the partially heated and degasified water will fall into the annular collection space 16', from which it will flow through the annular passage 17 to the entrance end of the mixing or combining tube or passage 18.

The steam utilized for heating and deaerating the water, which may be derived from any suitable source such as the exhaust steam from an engine, enters the heater and deaerator through the steam inlet 19. Passing into the shell 10, it enters the entrance end of the annular passage 20, which passage is U-shaped in cross-section and has its exit end 21 extending upwardly into the tube or passage 18, at the entrance end of the latter. The steam passing through the passage 20 coacts with the head of the water in the collection space 16' to carry the water upwardly into and through the mixing or combining tube or passage 18. The steam and water enter the mixing or combining tube or passage 18 in parallel flow.

The mixing or combining tube or passage 18 is in the form of a diffuser, gradually increasing in cross-sectional area from its entrance end to its exit end so that the steam and water mix at a point of constant cross-sectional area and pass at high velocity to a point of gradually increasing area and reduced pressure, resulting in a further heating of the water to the temperature corresponding to this steam pressure, which is higher than the steam pressure in the initial heating and deaerating space or compartment 14.

From the mixing passage 18 the mixed water and steam are projected into an area of lower pressure, namely the space or compartment 23 between the baffle 16 and the tube or passage 18. The projection of the mixed steam and water into the compartment 23 of lower pressure results in a thorough scrubbing of the water by the steam, and a portion of the water will reboil or flash, under the reduced pressure, thereby releasing entrained oxygen or dissolved gases present in the water and causing a further and practically complete degasification of the water.

The finally heated and degasified water falls from the compartment 23 into the collection cone 24, from which it passes through the tube 25 into the storage compartment 11.

Steam in excess of the quantity required for thoroughly heating and degasifying the water in the compartment 23 is admitted to the apparatus. The non-condensed steam and released gases will flow from the compartment 23 through the sinuous path formed by the baffles 26 and 27, through the space 15 and into the initial heating and deaerating compartment 14. Any steam which is not condensed in this initial compartment 14, together with the released gases passes into the space 28 in the shell 10 and from there through a suitable connection 29 to a vent condenser, of any approved construction. The vapor or steam condensed in the vent condenser 30 is returned to the collection space 16 through the drain 31.

A vent pipe 32 is provided which opens into the space 33 inwardly of the inner wall 18' of the mixing or combining tube or passage 18 so as to allow any steam or gases which might accumulate in this space to pass upwardly into the space 28 and from there to the vent condenser.

The baffles 26 and 27 prevent any of the water from the initial heating and deaerating compartment 14 from passing into the space 23 on its way to the collection space 16.

The cycle of operation of the device is: the water to be treated is sprayed in a finely divided, substantially atomized spray into a low pressure compartment where it contacts with the steam and receives its initial heating and deaeration or degasification. From the initial partial heating and partial deaeration the water passes to a point where it mixes, in parallel flow, with the steam, at a point in close proximity to the initial entrance of the steam. The steam and water pass, in mixing and combining parallel flow, through a mixing or combining tube of gradually increasing cross-sectional area resulting in a reduction of pressure during the mixing flow of the steam and water. This heats the water to a temperature corresponding to the steam pressure, which is higher than the steam pressure in the initial heating and deaerating compartment. From the mixing, parallel, confined flow of the steam and water, they are projected into an open chamber, of lower pressure, resulting in a reboiling or flashing of part of the water and the release of dissolved oxygen and gaseous content of the water, providing substantially complete degasification. The water then passes to the storage compartment, while the released oxygen and gas and uncondensed steam pass at the reduced pressure into the initial heating and deaerating compartment 14, finally passing from such compartment to a vent condenser, where the steam is condensed and the resultant condensate returned to the heater, the released oxygen and non-condensable gases being discharged to atmosphere through a suitable vent, as indicated at 33'.

The water to be treated, entering the initial heating and degasifying compartment 14, has the property of requiring a relatively great amount of steam, and will tend to maintain a pressure in this compartment low enough to draw sufficient steam from the compartment 23 to heat the water in the initial compartment.

Figure 4:
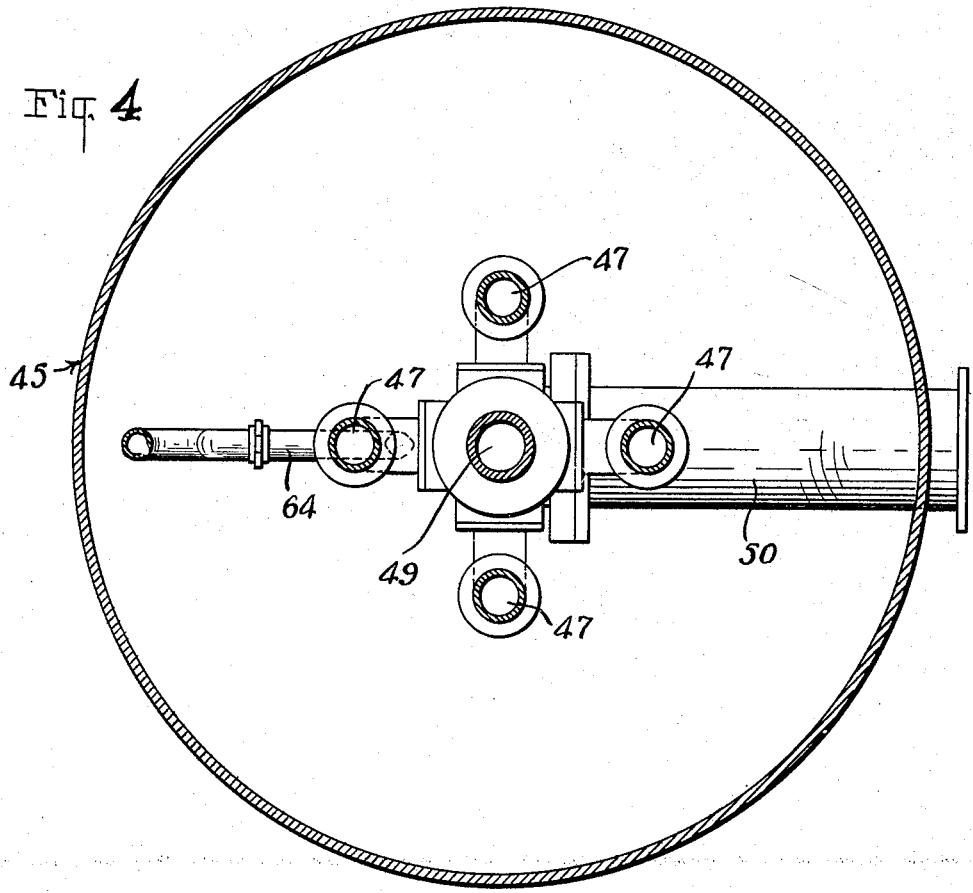
Figure 4 is a horizontal cross-section taken on the line 4—4 of Fig. 3.
Figure 5:
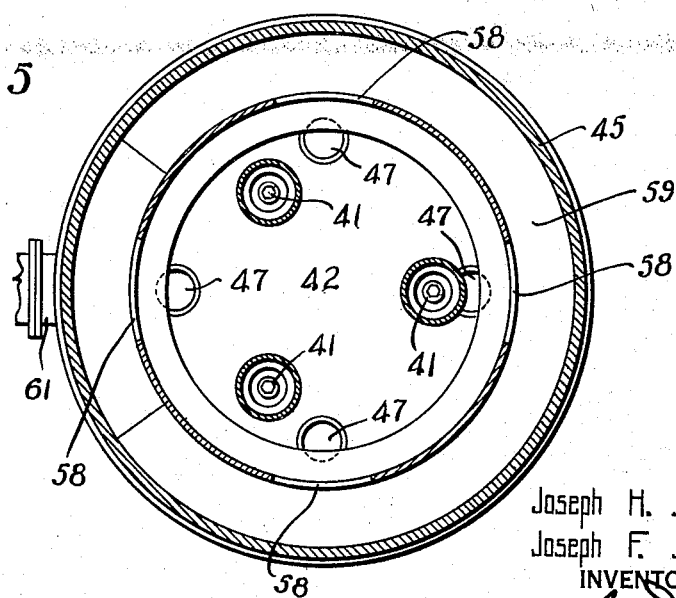
Figure 5 is a horizontal cross-section taken on the line 5—5 of Fig. 3.

In Figures 3 to 5, inclusive, of the drawings a modified construction of the apparatus is shown, but this construction embodies the same fundamental principles as those embodied in the form shown in Figures 1 and 2. The same cycle of heating and degasification of the water is provided, in that this apparatus provides initial partial heating and partial deaeration in the initial chamber into which the water to be treated is sprayed, in a fine film or spray, and from the initial heating and deaeration chamber the water passes, from a suitable collection space, into a mixing or combining tube or passage, where thorough mixing of the incoming steam and the water is provided. This tube or passage gradually increases in cross-sectional area toward its exit end. From the exit of this passage the mixed steam and water are projected into a space or area of lower pressure, resulting in the final step of deaeration or degasification and utilizing the full value of the steam for heating the water to the temperature proportionate to the pressure of the steam in that the final heating is provided in the mixing tube or passage, with the steam under its highest pressure.

In the construction shown in Figures 3 to 5 of the drawings the water enters the entrance space 40, from which it is sprayed, in a fine film or spray, by means of a plurality of atomizing spray valves 41, into the initial heating and deaerating space 42. The water passes or falls from the initial heating and deaerating space 42, in a partially heated and deaerated state, into the collection pan or space 43. The spaces 42 and 43 are formed by an annular partition 44, spaced inwardly of the outer wall or shell 45 of the heater so as to provide an annular space 46 about the spaces or compartments 42 and 43. The partially heated and deaerated water flows from the collection pan or space 43 through a plurality of tubes 47 downwardly, and upwardly through the curved portions 48, to the entrance end of the mixing or combining tube or passage 49, where it is intimately engaged by steam, which enters the heater through the initial inlet 50. The steam, passing through the inlet 50 and into the mixing and combining tube 49, acts upon the water and thoroughly mixes with the water. The thoroughly mixed water and steam pass upwardly through the mixing or combining tube or passage 49. The steam and water mix while traveling in substantially parallel paths upwardly through the gradually increasing cross-sectional area of the passage 49, where the pressure is reduced. It is then discharged from the outlet end of the tube or passage into the space 51, which is a space of lower pressure. When the mixed steam and water are discharged into the lower pressure space 51 a reboiling or flashing of part of the water occurs, resulting in substantially complete deaeration or degasification of the water. The water then falls into the storage compartment 52 of the shell 45, from which it is drawn as needed.

A spring loaded valve 53 is provided at the point at or near the point of entrance of the steam into the mixing or combining tube 49 for controlling the velocity at which the steam is admitted to the mixing or combining tube. The velocity is controlled by maintaining a constant pressure drop across the valve 53, through the action of the spring 54.

A second spring-loaded valve 55 is mounted at the exit end of the mixing or combining tube 49. This valve, loaded by the spring 56, maintains a constant pressure in the diffuser type mixing tube 49 so that intimate mixing and heating of the water occurs, in a confined space, under pressure.

The non-condensed steam and the released oxygen and non-condensable gases pass from the space 51 upwardly through the annular space 46 and through suitable openings 57 in the partition 44 into the initial heating and deaerating space or compartment 42. From the initial heating and deaerating compartment 42 the released oxygen and non-condensed vapors pass through suitable openings 58 in the partition 42 into the space 59 about the partition 42 and formed by the horizontal partition 60, which isolates the space 59 from the annular space 46.

From the space 59 the oxygen and released gases, together with such steam as has not been condensed in the compartment 42, passes through a suitable connection 61 to a vent condenser 62, of any approved construction. From the vent condenser 62 the oxygen and non-condensable gases are released through a suitable vent, as indicated at 63, while the condensed vapor is returned to the interior of the heater structure through a trapped connection 64, preferably at a point slightly in advance of the point of entrance of the water into the diffuser type mixing tube 49.

In the construction shown the cooling water employed in the vent condenser 62 enters through a suitable inlet 65, and is discharged from the vent condenser through the outlet 66, which opens into the space 40 of the heater, so that the cooling water for the vent condenser is delivered to the heating and deaerating apparatus for treatment therein.

In all essential features of operation this mechanism shown in Figures 3 to 5, inclusive, is the same as that shown in Figures 1 and 2, the principal differences being that in the form shown in Figures 3 to 5 means are provided for maintaining a constant steam velocity independent of load conditions, and also for maintaining a constant pressure in the diffuser or mixing space, namely the provision of the spring loaded valves 53 and 55.

The form shown in Figures 6 to 9, inclusive, of the drawings, like the previous forms shown in Figures 1 to 5, inclusive, embodies the new and novel feature or fundamental principle, the cycle of initial partial heating and deaerating, thorough mixing and heating of the partially heated and partially deaerated water by passage of the mixed steam and water in parallel flow through a mixing passage or tube of the diffuser type, and final deaeration by discharge of the thoroughly mixed and heated water and steam into an area of low pressure, resulting in the reboiling or flashing of a part of the water and complete separation of the oxygen or dissolved gaseous content of the water.

This structure, as that shown in Figures 3 to 5, inclusive, embodies means for maintaining constant steam velocity independently of steam flow, and also for maintaining a constant pressure in the diffuser or mixing space insuring intimate mixing of the steam and water in such space and heating the water to the temperature proportionate to the steam pressure.

The water enters the water inlet space or compartment 70, in the shell 71, through a suitable inlet pipe 72, and from the water inlet compartment 70 the water is sprayed in a fine film or spray by means of a spray valve 73, of any approved type, into the initial heating and deaerating compartment 74. The partially deaerated and heated water passes from the initial contact or heating compartment 74 into the collection well or space 75, being guided in its fall into the collection space by the guiding baffles 76.

The steam enters the heater through the steam inlet pipe 76, which extends inwardly and downwardly through the collection chamber 75, substantially at the axis of the collection chamber. This pipe 76 has an upturned flange 77 about its outlet end which cooperates with the combined valve and guiding member 78 to direct the steam upwardly into the mixing or combining passage or tube 79. The mixing passage 79 is formed between the outer surface of the wall 80 of the water collection space or chamber 75, and the inner surface of the substantially conical valve member 78. The wall 80 is provided with openings 81 in the bottom thereof which permit the water to pass into the mixing passage or tube 79 near the entrance end thereof. The steam passes through the space between the valve face 82 on the inner surface of the member 78 and the flange 77 and enters the passage or tube 79 in substantially parallel flow with the water entering the tube or passage 79. The steam and water pass through the mixing passage 79, wherein they are thoroughly mixed, and where the water is heated to the temperature corresponding to the pressure of the steam. The mixed steam and water are sprayed from the constricted outlet opening 82' of the passage 79 into the space about the outer surface of the collection chamber 80 and valve member 78, which is a space of lower pressure. There part of the water will reboil or flash, resulting in the release of the entrained oxygen and gases and providing substantially complete deaeration or degasification of the water. The annular outlet opening 82' is formed by the upper edge of the valve member 78, and the facing surface 83 formed on the flange 84.

The valve member 79 is mounted upon a bolt or rod 85, for movement thereon relative to the stationary wall 80 of the collection chamber 75. Thus the cross-sectional area of the mixing passage or tube 79 may be varied, and also the steam inlet opening provided by the flange 77 and valve face 82, as well as the outlet opening 82', allowing for regulation to maintain proportional steam flow and water flow and maintenance of proper proportional relation between the size of the outlet opening 82' and the area of the passage 79. The valve member 78 is in effect a spring loaded valve, being loaded by a spring 86, controlling the velocity of the steam entering the mixing passage or tube 79, while the size of the outlet opening 82' varies accordingly to maintain a constant pressure in the mixing passage or tube 79, insuring intimate mixing and heating of the feed water in a confined space, under pressure.

As in both of the other forms heretofore described, the mixing passage 79 gradually increases in cross-sectional area, from its entrance end to its exit or outlet end, so as to provide slight pressure reduction during the flow of the mixed steam and water therethrough.

In the present construction the velocity of the steam, the cross-sectional area of the passage 79, and the cross-sectional area of the outlet 82' are all controlled by movement of the spring loaded member 78 in proportion to the water flow in the heater, thereby maintaining under different load conditions constant pressure and velocity regulation in and through the mixing passage 79.

The oxygen and non-condensable gases, released after the expulsion of the mixed steam and water through the opening 82', together with uncondensed steam, pass upwardly and through the tortuous passage 87 into the initial heating and deaerating compartment 74, through the bottom thereof. Thus the steam contacts the water in the initial compartment in a transverse flow direction to the direction of flow of the water.

The released oxygen and gases, together with any non-condensed vapor or steam, pass outwardly through the vent 88 to a vent condenser (not shown), while the condensate from said vent condenser (not shown) is returned to the water collection space 75, through a suitable connection 89.

In this construction of heater, shown in Figures 6 to 9, inclusive, the velocity of the steam, the area or volume of the mixing passage, and the spraying outlet orifice of the mixing passage, are controlled in accordance with the pressure of the steam entering the heater through the steam inlet 76. The quantity of the steam passing into the mixing passage or tube 79 is proportional to the heat absorbing properties or to the rate of flow of water into the heater, and the steam will flow proportionately to the heat absorbing capacity of the water, while the spring will maintain constant velocity independent of the steam flow.

In both the form shown in Figures 3 to 5, inclusive, and in that shown in Figures 6 to 9, inclusive, respectively, the mixing passages or tubes 49 and 79 respectively have peripheral outlets and both forms provide means for regulating the cross-sectional area of such peripheral outlets. For instance, in the form shown in Figures 3 to 6 the spring loaded valve 55 serves the dual purpose of maintaining the pressure in the tube and of regulating the cross-sectional area of the peripheral discharge opening from the tube. While in the form shown in Figures 6 to 9, the cross-sectional area of the peripheral discharge opening from the tube or passage, indicated at 82', is controlled by the movement of the spring loaded valve member 78.

It will be understood that the invention is not to be limited to the specific construction or arrangement of parts shown, but that they may be widely modified within the invention defined by the claims.

What is claimed is:

1. Water heating and deaerating apparatus comprising in combination, a shell having an initial heating and deaerating chamber therein, means for passing water in finely divided form into said initial chamber, means in said shell forming a confined passage opening at its outlet into a space of lower pressure in the shell, means for directing water from said initial chamber into said confined passage, and means for directing steam from its initial inlet into said confined passage in parallel flow to the water flow into the passage whereby the water and steam will pass in mixing relation through said passage, said mixing passage having a cross-sectional area sufficient to regulate its volumetric capacity in accordance with the rated capacity of the apparatus so that the mixing passage will at all times be filled with a mixture of steam and water during operation of the apparatus to insure thorough mixing of the steam and water.

2. Water heating and deaerating apparatus comprising in combination, a shell having an initial heating and deaerating chamber therein, means for passing water in finely divided form into said initial chamber, means in said shell forming a confined passage opening at its outlet into a space of lower pressure in the shell, means for directing water from said initial chamber into said confined passage, means for directing steam from its initial inlet into said confined passage in parallel flow to the water flow into the passage whereby the water and steam will pass in mixing relation through said passage, and loaded means maintaining constant pressure in said passage to insure intimate mixing of the steam and water.

3. Water heating and deaerating apparatus comprising in combination, a shell having an inlet heating and deaerating chamber therein, means for passing water in finely divided form into said initial chamber, means in said shell forming a confined passage opening at its outlet into a space of lower pressure in the shell, means for directing water from said initial chamber into said confined passage, means for directing steam from its initial inlet into said confined passage in parallel flow to the water flow into the passage whereby the water and steam will pass in mixing relation through said passage, loaded means maintaining constant pressure in said passage to insure intimate mixing of the steam and water, and loaded means for controlling the velocity at which the steam enters said passage.

4. Water heating and deaerating apparatus comprising in combination, a shell having an initial heating and deaerating chamber therein, means for passing water in finely divided form into said initial chamber, means in said shell forming a confined passage opening at its outlet into a space of lower pressure in the shell, means for directing water from said initial chamber into said confined passage, means for directing steam from its initial inlet into said confined passage in parallel flow to the water flow into the passage whereby the water and steam will pass in mixing relation through said passage, and loaded means for regulating the size of the outlet of said passage in proportion to the mixed steam and water flow through the passage.

5. Water heating and deaerating apparatus comprising in combination, a shell, a partition in said shell forming an initial heating and deaerating chamber in the shell, means for spraying water in a finely divided form into said initial chamber, means in said shell forming a confined mixing passage, means for conducting water from said initial chamber to the entrance of said passage, means for directing steam from its initial point of entrance into the apparatus to the entrance of said passage whereby the steam and water will flow through said passage in intimate mixing relation, said passage having a peripheral outlet and loaded means regulating the cross-sectional area of said peripheral outlet.

6. Water heating and deaerating apparatus comprising in combination, a shell, a partition in said shell forming an initial heating and deaerating chamber in the shell, means for spraying water in finely divided form into said initial chamber, a wall in said shell forming a water collection chamber, a member cooperating with said wall to form a confined mixing passage opening out at its discharge end into an area of low pressure in the shell, said wall provided with openings to direct water to the entrance end of said passage, means for directing steam from its point of initial entrance into the apparatus to the entrance of said passage whereby the steam and water will flow through the passage in mixing relation and be discharged in a thoroughly mixed condition into an area of lower pressure than the pressure in the passage, said member being supported for movement relative to said wall whereby the member may move to control the velocity of steam entering the passage and the volume of the passage.

7. In a water heating and deaerating apparatus, an initial treatment chamber, means for introducing water into said chamber, means forming a confined mixing passage for steam and water, steam introducing means, means at the entrance of said passage for directing the steam and water entering the passage in parallel mixing flow relationship, and a stage treating chamber receiving the mixed steam and water from said passage, said mixing passage having a cross-sectional area sufficient to regulate its volumetric capacity in accordance with the rated capacity of the apparatus so that the mixing passage will at all times be filled with a mixture of steam and water during operation of the apparatus to insure thorough mixing of the steam and water.

8. In a water heating and deaerating apparatus, an initial treatment chamber, means for introducing water into said chamber, means forming a confined mixing passage for steam and water, steam introducing means, means at the entrance of said passage for directing the steam and water entering the passage in parallel mixing flow relationship, a stage treating chamber receiving the mixed steam and water from said passage, and pressure actuated means operable by the pressure of incoming steam for varying the cross-sectional area of said mixing passage proportionately to the pressure of the entering steam.

9. In a water heating and deaerating apparatus, an initial treatment chamber, means for introducing water into said chamber, means forming a confined mixing passage for steam and water, steam introducing means, means at the entrance of said passage for directing the steam and water entering the passage in parallel mixing flow relationship, a stage treating chamber receiving the mixed steam and water from said passage, and said passage being of gradually increasing cross-sectional area towards its outlet for converting velocity of flow of mixed water and steam into pressure to insure intimate mixing of the steam and water in the passage.

10. In a water heating and deaerating apparatus, an initial treatment chamber, means for introducing water into said chamber, means forming a confined mixing passage for steam and water, steam introducing means, means at the entrance of said passage for directing the steam and water entering the passage in parallel mixing flow relationship, a stage treating chamber receiving the mixed steam and water from said passage, said mixing passage being of gradually increasing cross-sectional area towards its outlet for converting velocity of flow of mixed water and steam into pressure to insure intimate mixing of the steam and water in the passage, and means at the outlet of said passage for reducing the cross-sectional area of the passage for converting pressure of flow into velocity to break up the stream of mixed water and steam.

11. In water heating and deaerating apparatus, an initial treatment chamber, means for introducing water into said initial treatment chamber, a water collecting chamber for receiving partly treated water from said initial treating chamber, a pressure actuated movable member cooperating with a wall of said collecting chamber to form a mixing passage open at its inlet end to said collecting chamber, means for introducing steam into the inlet end of said passage, said steam introducing means passing through said collecting chamber and constructed and arranged to maintain the incoming steam and water in the collecting chamber in separated heat transfer relationship, said mixing passage being of gradually increasing cross-sectional area towards its outlet for converting velocity of flow of mixed water and steam into pressure to insure intimate mixing of the steam and water in the passage, and means at the outlet of said mixing passage for breaking up the stream of mixed water and steam.

12. In water heating and deaerating apparatus, an initial treatment chamber, means for introducing water into said chamber, means forming a confined mixing passage for steam and water, means for conducting water from said initial treatment chamber to the entrance of said mixing passage, means for introducing steam into the entrance of said mixing passage, a low pressure chamber into which said mixing passage discharges the mixed steam and water, said water conducting means being constructed and arranged to maintain water therein in separated heat exchange relationship with steam in said low pressure chamber, said mixing passage being of gradually increasing cross-sectional area towards its outlet for converting velocity of flow of mixed water and steam into pressure to insure intimate mixing of the steam and water in the passage, and means at the outlet of said passage for breaking up the stream of mixed water and steam whereby some of the mixed steam and water will flash into vapor upon entrance into the low pressure chamber.

13. In a water heating and deaerating apparatus, an initial treatment chamber, means for introducing water into said chamber, means forming a confined mixing passage for steam and water, said passage being of sufficient length to cause a thorough mixing of steam and water during their passage therethrough, steam introducing means, means at the entrance of said passage for directing the steam and water entering the passage in parallel mixing flow relationship, a low pressure chamber in said apparatus for receiving the mixed steam and water from said passage, and means for automatically varying the volumetric capacity of the mixing passage in proportion to variations in the pressure of the incoming steam.

14. In a water heating and deaerating apparatus, a shell having an initial heating and deaerating chamber therein, means for passing water into said initial chamber, means in said shell forming a confined mixing passage opening at its outlet into a space of lower pressure in the shell, means for directing water from said initial chamber into said mixing passage, means for directing steam from its initial inlet into said confined passage in parallel flow to the water flow into the passage whereby water and steam will pass in mixing relation through said passage, said mixing passage having a cross-sectional area sufficient to regulate its volumetric capacity in accordance with the rated capacity of the apparatus so that the mixing passage will at all times be filled with a mixture of steam and water during operation of the apparatus to insure thorough mixing of the steam and water, and means for automatically varying the volumetric capacity of the mixing passage in proportion to variations in the pressure of the incoming steam.

JOSEPH H. SEBALD.
JOSEPH F. SEBALD.